Nov. 7, 1944.  A. S. HOWELL  2,362,204
STRIP FEED SPROCKET DEVICE
Filed June 17, 1942  2 Sheets-Sheet 1
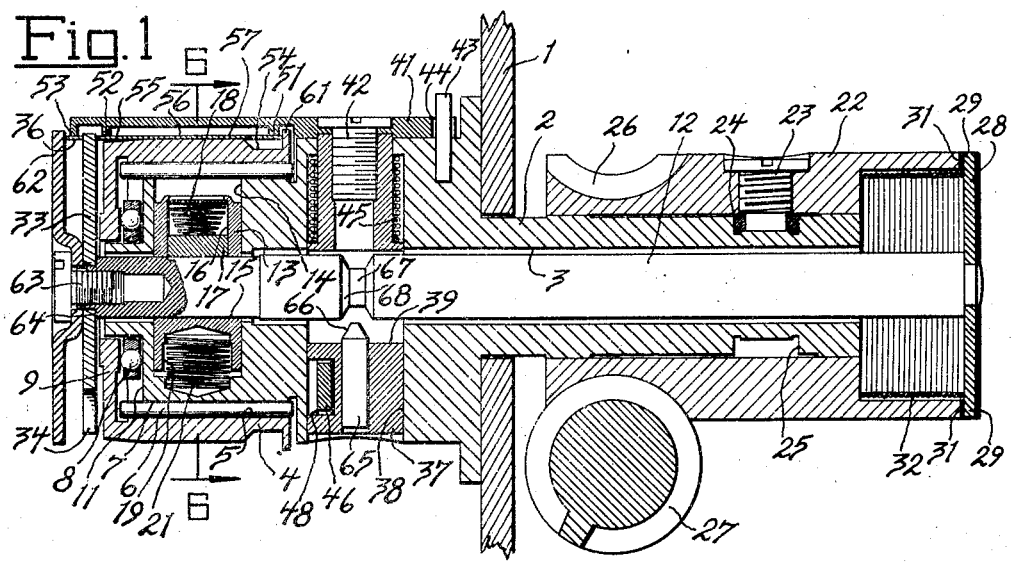
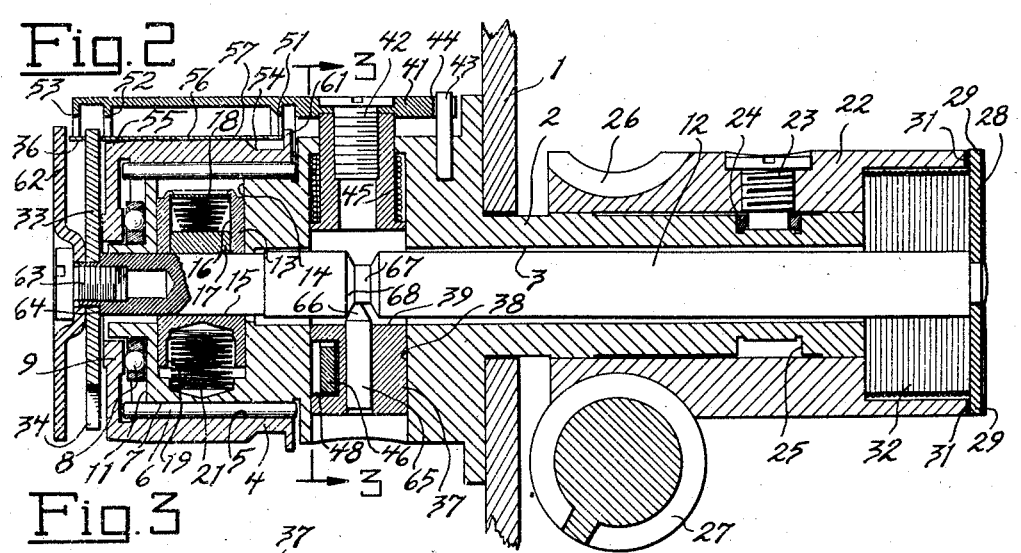
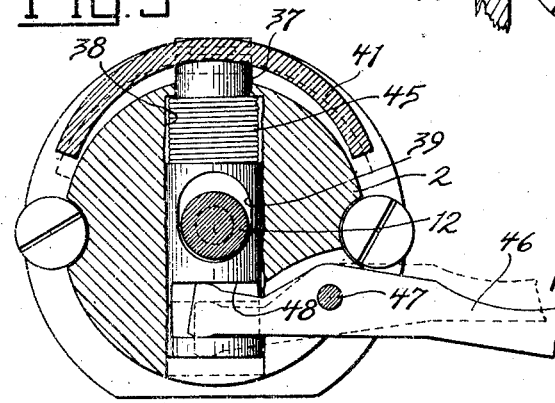
INVENTOR
ALBERT S HOWELL
BY
ATTY.

Nov. 7, 1944.  A. S. HOWELL  2,362,204
STRIP FEED SPROCKET DEVICE
Filed June 17, 1942   2 Sheets-Sheet 2
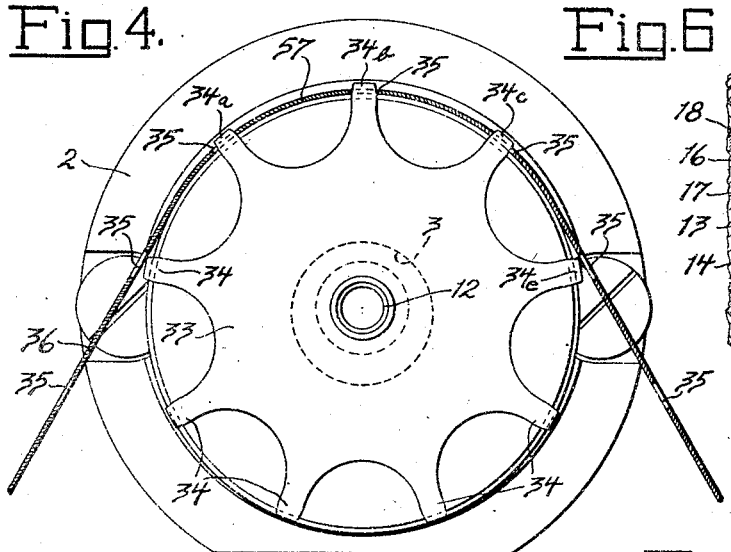
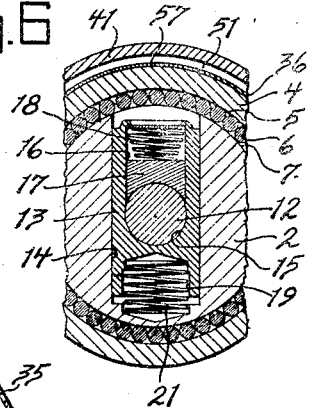
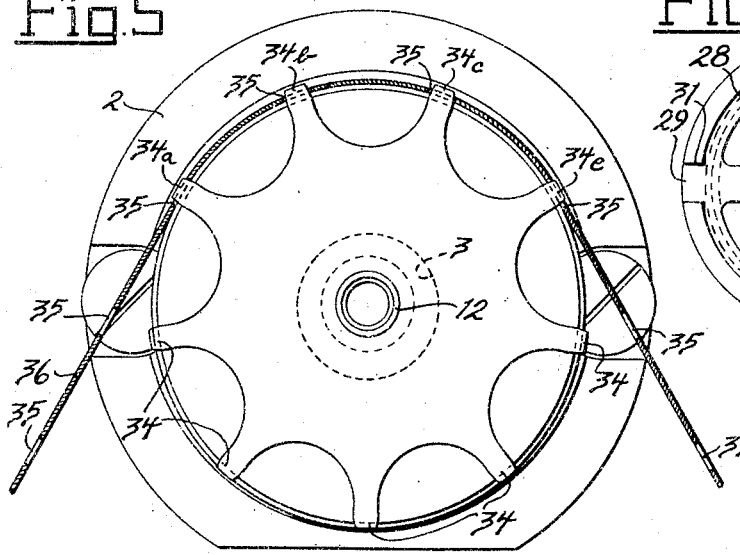
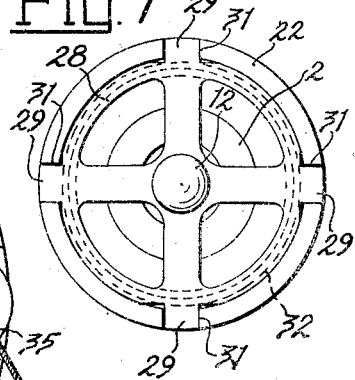
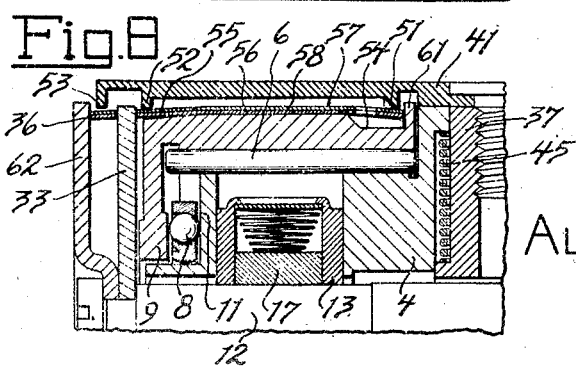
INVENTOR
ALBERT S. HOWELL
BY Robert F. Wilkie
ATTY.

Patented Nov. 7, 1944

2,362,204

UNITED STATES PATENT OFFICE 2,362,204

STRIP FEED SPROCKET DEVICE

Albert S. Howell, Culver, Ind., assignor to The Bell & Howell Company, Chicago, Ill., a corporation of Illinois Application June 17, 1942, Serial No. 447,357

14 Claims. (Cl. 74—240)

My invention relates particularly to a strip feed sprocket device for photographic motion picture and/or sound record film strips provided with the usual longitudinally spaced feed perforations, and has for its principal object the provision of a strip feed sprocket device which eliminates periodic jerk or unevenness in the feed of a strip incident to successive engagement or disengagement of the teeth of the sprocket with feed perforations of the strip and which accommodates for variance between the sprocket tooth spacing and strip perforation spacing, such as may be due to expansion or contraction of the strip, all with a view toward accurately uniform feed of the strip which is particularly important in the feed of photographic sound record strips.

Other objects reside in the provision of a practical construction susceptible to the attainment of the above object, the accommodation for thickness irregularities of the record strip such as the splicing of the usual feed perforated photographic motion picture or sound record film strip, edge guiding of the strip, and convenient lacing of the record strip in the device.

The invention will be better understood by reference to the accompanying drawings, in which—

Figure 1 is an axial section of a strip feed sprocket device embodying my invention;

Figure 2 is a section similar to Figure 1, but showing parts in different positions than those in which they are shown in Figure 1;

Figure 3 is a sectional view substantially on the line 3—3 of Figure 2;

Figures 4 and 5 are similar views normal to the axis of the device with parts omitted and showing the feed sprocket, hereinafter described, in different positions of operation with respect to a feed perforated strip (shown in section);

Figure 6 is a partial section substantially on the line 6—6 of Figure 1;

Figure 7 is a partial end view as viewed toward the left in Figures 1 and 2; and Figure 8 is an enlarged partial section similar to Figure 1 and showing the device during the progress of a splice of the feed strip therethrough.

Referring particularly to Figures 1 and 2, 1 designates a bored frame member, and a generally cylindrical support member 2 extends through this frame member and is suitably secured therewith, the support member 2 being provided with an axial bore 3.

A roller 4, provided with an axial bore 5, is rotatably mounted on the support member 2 in the region of one end thereof and in surrounding relation with the bore 3 of the support by means of anti-friction bearing rollers 6 interposed between the bore 5 and a circumferential surface 7 of the support member 2, and a ball thrust bearing 8 is interposed between an internal flange 9 on the outer end of the roller and an opposing shoulder surface 11 of the support member 2 to oppose inward thrust of the roller.

A rotatable shaft 12 extends longitudinally in the bore 3 of the support member 2 in approximately coaxial relation with the roller 4. A cylindrical bearing member 13 is slidably mounted in a vertical diametrical bore 14 in the support member 2 in the region of the roller 4, and is provided with an intermediate diametrical bore 15 through which the shaft 12 extends and is journaled, it being observed that this shaft bearing is disposed in the region of the roller 4 and is mounted on the support 2 for movement radially thereof and consequently for movement of the shaft relative to the roller radially thereof.

The upper portion of the bearing member 13 is provided with an axial bore 16 communicating with the bearing bore 15, and a bearing block 17 is slidably mounted in the bore 16 and is yieldably urged into bearing engagement with the shaft 12 by a spring 18 reacting on the bearing member 13 to maintain snug journaling of the shaft.

The lower portion of the bearing member 13 is provided with a blind axial bore 19, and a spring 21, engaged in this bore, is operative between the support member 2 and the bearing member 13 to yieldably urge this bearing member and consequently the shaft 12 upwardly and radially of the roller 4.

An axially bored transmission member 22 is rotatably mounted by means of its bore on the other end of the support member 2 in approximately coaxial relation with the roller 4, end thrust of the transmission member being prevented by a screw stud 23 screwthreaded into the transmission member radially thereof and a bearing roller 24 rotatably mounted on the inner end of the screw stud and engaging in a circumferential groove 25 on the support member 2.

The transmission member 22 is provided with a worm gear 26 which meshes with a suitably rotatably mounted worm driving pinion 27 for the driving of the transmission member.

A universal joint member 28 is secured on the end of the shaft 12 remote from the roller 4 and is provided with angularly spaced radially projecting teeth 29 which are slidably engaged in angularly spaced radial universal joint slots 31 on the corresponding end of the transmission member 22, to provide a universal joint device between the transmission member and the shaft 12 and disposed axially remote from the roller 4 to permit movement of the shaft relative to this roller radially thereof as provided by the slidably mounted bearing member 13. A spring 32, operative between the transmission member 22 and the universal joint member 28 axially of the shaft 12, yieldably urges the shaft axially in the direction inwardly of the outer end of the roller 4 for a purpose hereinafter described.

A sprocket 33, provided with angularly spaced radial feed teeth 34, is secured on the end of the shaft 12 corresponding with the outer end of the roller 4 for rotation with the shaft and is disposed immediately beyond the outer end of this roller in approximately coaxial relation therewith for multi-toothed feeding engagement with longitudinally spaced feed perforations 35 of a strip 36 engaged on the roller 4 as hereinafter described, the strip being as shown a usual motion picture and/or sound record film strip.

A stud 37 is slidably mounted in a vertical diametrical bore 38 through the support member 2 inwardly of and adjacent the inner end of the roller 4, the stud 37 being provided with an intermediate vertically elongated bore 39 through which the shaft 12 extends, this bore permitting vertical movement of the stud with reference to the shaft, as best shown in Figure 3.

An arcuate guide member 41 is secured on the upper end of the stud 37 by means of a headed screw 42. The guide member 41 overlies the upper portion of the roller 4 and is disposed in arcuate correspondence with the upper portion of the periphery of the roller and extends outwardly beyond the outer end of the roller, the guide member being maintained against angular movement on the axis of the stud 37 by a vertically disposed pin 43 secured on the support member 2 in spaced relation with the stud 37 and slidably engaging a slot 44 on the inner end of the guide member.

By reason of the slide mounting of the stud 37, the guide member 41 is movable vertically from a lower position in adjacent strip guiding relation with the roller 4, as shown in Figures 1, 6 and 8, to an upper position out of strip guiding relation for insertion and removal of the strip with respect to the guide formed by the roller 4 and guide member 41, as shown in Figures 2 and 3.

A spring 45, within the bore 38 and encircling the stud 37, is operative between the support member 2 and the stud 37 to yieldably urge the guide member 41 downwardly and to normally maintain the same in its lower strip guiding position, and a manually actuable lever 46 is intermediately pivoted on the support member 2, as designated at 47, and has one end engaged in a transverse slot 48 on the stud 37 for the convenient actuation of the guide member 41 into its upper non-guiding position.

The guide member 41 is provided with three downwardly projecting and facing concave guide portions 51, 52 and 53 spaced axially of the roller 4, of which the guide portions 51 and 52 are disposed respectively opposite the inner and outer end portions 54 and 55 of the roller 4 and of which the guide portion 53 is disposed outwardly beyond the outer end of the roller with the sprocket 33 disposed between the guide portion 53 and the guide portion 52 adjacent thereto, it being observed that the guide member 41 has non-guiding relation with the intermediate portion 56 of the roller 4.

When the guide member 41 is in its lower strip guiding position, it cooperates with the roller 4 in forming therewith an arcuate portion 57 of the strip 36 with which the sprocket 33 has multi-toothed engagement, as best shown in Figures 1, 4 and 5. The sprocket, as yieldably urged by the spring 21, is yieldably urged relatively to the roller 4 radially of the intermediate of the arcuate strip portion 57 into toothed engagement with the arcuate strip portion, a marginal strip perforated portion of which overhangs the outer end of the roller 4 for engagement by the sprocket. With this yieldable urge of the sprocket into toothed engagement with the arcuate portion 57 of the film strip radially of the intermediate of the arcuate portion, the sprocket teeth are urged into toothed engagement with the strip in a manner increasingly tangential to the arcuate portion 57 as the distance of the teeth from the intermediate of the arcuate portion increases with correspondingly increasing transverse perforation edge engaging effect by the teeth. Consequently, inasmuch as the sprocket has multi-toothed engagement with the arcuate strip portion and is yieldably urged into toothed engagement therewith radially of the intermediate of the arcuate strip portion, this yieldable urge of the rotated sprocket constantly maintains two sprocket teeth in opposing contact with oppositely disposed transverse edges of the respectively engaged strip perforations 35, thus maintaining a constantly fixed two-way connection between the sprocket and film strip, irrespective of variations of the spacing of the feed perforations of the strip and accommodating for such variations by the radial movement of the sprocket as radially urged into toothed engagement with the strip.

Furthermore, the transfer of control of the strip from one pair of sprocket teeth to another pair is obviously gradual so that jerkiness in the feed of the film by reason of the sequential engagement of the sprocket teeth with the feed perforations of the strip is minimized. As an example, in Figure 4, three sprocket teeth $34_a$, $34_b$ and $34_c$ are engaged in corresponding feed perforations 35 of the strip, the tooth $34_b$ being alined with the radial movement of the sprocket. In this position of the sprocket, the teeth $34_a$ and $34_c$ are in opposing contact with oppositely disposed transverse edges of the respectively engaged strip perforations, the sprocket tooth $34_b$, between the teeth $34_a$ and $34_c$, being thus in centered or non-controlling relation with its strip perforation or being what might be called neutral with respect thereto.

Assuming, counterclockwise movement of the sprocket from the position of Figure 4 to that of Figure 5, a fourth sprocket tooth $34_e$ following the tooth $34_c$ additionally engages a corresponding strip perforation, thus transferring control of the film to the sprocket tooth $34_e$ in cooperation with the tooth $34_a$ and rendering the tooth $34_c$ neutral as well as maintaining the tooth $34_b$ neutral. Further counterclockwise movement of the sprocket again attains the condition of Figure 4 but in which the teeth $34_b$, $34_c$ and $34_e$ attain the positions respectively of the teeth $34_a$, $34_b$ and $34_c$ in Figure 4 and the teeth $34_b$ and $34_e$ control the film with the tooth $34_c$ neutral, and so on. Variations of the strip perforation spacing are accommodated for by corresponding radial movement of the sprocket under control of the spring 21.

The end portions 54 and 55 of the roller 4 are of lesser radius than the intermediate portion 56 thereof, and the guide portions 51, 52 and 53 of the guide member 41, when in strip guiding relation with the roller, are spaced radially of the roller approximately at the radius of the convex surface of the arcuate strip portion 57 as established by the intermediate portion 56 of the roller, as shown in Figures 1 and 8, so that when a splice 58, see Figure 8, passes over the roller, the edge portions of the strip are bent inward for the passage of the splice, it being observed that the guide member 41 has non-guiding relation with the intermediate portion 56 of the roller for the passage of the splice.

A strip edge guide flange 61 is formed on the inner end of the roller 4 for engagement with the inner edge of the arcuate strip portion 57, see Figure 1, and an opposing strip edge guide flange 62 is secured on the shaft 12 outwardly of the sprocket 33 for engagement with the outer edge of the arcuate strip portion, these opposing edge guide flanges edgewise confining the arcuate strip portion. The flange 62 is secured on the shaft 12 together with the sprocket 33 by means of a headed screw 63 screwthreaded into the outer end of the shaft 12 and clamping the sprocket 33 and flange 62 between it and a shoulder 64 on the shaft.

The spring 32 yieldably urges the shaft 12 axially and with it the edge guide flange 62 toward the edge guide flange 61 to maintain accurate edge guiding of the arcuate strip portion 57.

A pin 65 is secured on and within the stud 37 and projects upwardly into the bore 39 of the stud. See Figures 1 and 2. The upper end of the pin 65 is tapered, as designated at 66, and is engageable into a circumferential groove 67 of the shaft 12 with upward movement of the stud 37 and consequent positioning of the guide member 41 out of guiding relation with the roller 4. The side of the groove 67 facing in the direction inwardly from the outer end of the roller 4 is tapered, as designated at 68.

When the guide member 41 is moved upwardly out of guiding relation with the roller 4 by upward movement of the stud 37, the pin 65 engages the bottom of the groove 67 to position the sprocket 33 radially upward in strip perforation engaging position and the taper 66 engages the tapered side 68 of the groove 67 to also position the sprocket and guide flange 62 axially against the influence of the spring 32 at a distance from the guide flange 61 greater than normal to facilitate insertion and removal of the film strip 36. See Figure 2.

While I have thus described my invention, I do not wish to be limited to the precise details described, as changes may be readily made without departing from the spirit of my invention, but having thus described my invention, I claim as new and desire to secure by Letters Patent the following:

1. In a strip feed sprocket device, the combination of guide means forming an arcuate portion of a feed perforated strip, a rotatable sprocket disposed in approximately coaxial relation with said arcuate strip portion and having multi-toothed engagement therewith and mounted for movement relative to said guide means radially of the intermediate of said arcuate strip portion, and yieldable means urging said sprocket radially into toothed engagement with said arcuate strip portion.

2. In a strip feed sprocket device, the combination of a rotatable roller, a cooperating guide member provided with a concave guide portion forming with said roller an arcuate portion of a feed perforated strip on said roller, a rotatable sprocket disposed in approximately coaxial relation with said roller and having multi-toothed engagement with said arcuate strip portion and mounted for movement relative to said roller radially of the intermediate of said arcuate strip portion, and yieldable means urging said sprocket radially into toothed engagement with said arcuate strip portion.

3. In a strip feed sprocket device, the combination of a bored support, a bored roller rotatably mounted thereon in surrounding relation with the bore of said support, guide means cooperating with said roller to form an arcuate portion of a feed perforated strip on said roller, a rotatable shaft extending longitudinally in the bore of said support in approximately coaxial relation with said roller and mounted for movement relative to said roller radially of the intermediate of said arcuate strip portion, a sprocket secured on said shaft and having multi-toothed engagement with said arcuate strip portion, and yieldable means operative on said shaft and urging said sprocket into toothed engagement with said arcuate strip portion.

4. In a strip feed sprocket device, the combination of a bored support, a bored roller rotatably mounted thereon in surrounding relation with the bore of said support, guide means cooperating with said roller to form an arcuate portion of a feed perforated strip on said roller, a rotatable shaft extending longitudinally in the bore of said support in approximately coaxial relation with said roller, a sprocket secured on said shaft and having multi-toothed engagement with said arcuate strip portion, a transmission member rotatably mounted on said support in approximately coaxial relation with said roller, a universal driving joint device between said transmission member and said shaft and disposed axially remote from said roller, a bearing disposed in the region of said roller and in which said shaft is journaled and mounted on said support for movement relative to said roller radially of the intermediate of said arcuate strip portion, and yieldable means urging said bearing in the direction toothedly engaging said sprocket with said arcuate strip portion.

5. In a strip feed sprocket device, the combination of guide means forming an arcuate portion of a feed perforated strip, a rotatable sprocket disposed in approximately coaxial relation with said arcuate strip portion and having multi-toothed engagement therewith and mounted for movement relative to said guide means radially of the intermediate of and axially of said arcuate strip portion, opposing strip edge guide elements for edgewise confining said arcuate strip portion therebetween and a first of which is axially fixed with said sprocket and a second of which is mounted independently of said sprocket, and yieldable means urging said sprocket radially into toothed engagement with said arcuate strip portion and said sprocket and first edge guide element axially of the sprocket toward said second edge guide element.

6. In a strip feed sprocket device, the combination of a rotatable roller, a cooperating guide member provided with a concave guide portion forming with said roller an arcuate portion of a feed perforated strip on said roller, a rotatable sprocket disposed in approximately coaxial relation with said roller and having multi-toothed engagement with said arcuate strip portion and mounted for movement relative to said roller axially thereof and radially of the intermediate of said arcuate strip portion, opposing strip edge guide flanges respectively axially fixed with said roller and sprocket for edgewise confining said arcuate strip portion therebetween, and yieldable means urging said sprocket radially into toothed engagement with said arcuate strip portion and said sprocket and the edge guide flange axially fixed therewith toward the edge guide flange axially fixed on said roller.

7. In a strip feed sprocket device, the combination of a bored support, of a bored roller rotatably mounted thereon in surrounding relation with the bore of said support, guide means cooperating with said roller to form an arcuate portion of a feed perforated strip on said roller, a rotatable shaft extending longitudinally in the bore of said support in approximately coaxial relation with said roller and mounted for movement relative to said roller axially thereof and radially of the intermediate of said arcuate strip portion, a sprocket secured on said shaft and having multi-toothed engagement with said arcuate strip portion, opposing strip edge guide elements for edgewise confining said arcuate strip portion therebetween a first of which comprises a flange fixed with said sprocket and a second of which is mounted independently of said sprocket, and yieldable means operative on said shaft and urging said sprocket radially into toothed engagement with said arcuate strip portion and said sprocket and said edge guide flange axially of the sprocket toward said second edge guide element.

8. In a strip feed sprocket device, the combination of a bored support, a bored roller rotatably mounted thereon in surrounding relation with the bore of said support, guide means cooperating with said roller to form an arcuate portion of a feed perforated strip on said roller, a rotatable shaft extending longitudinally in the bore of said support in approximately coaxial relation with said roller, a sprocket secured on said shaft and having multi-toothed engagement with said arcuate strip portion, a transmission member rotatably mounted on said support in approximately coaxial relation with said roller, a universal and axial slip driving joint device between said transmission member and said shaft and disposed axially remote from said roller, a bearing disposed in the region of said roller and in which said shaft is journaled and mounted for movement relative to said roller radially of the intermediate of said arcuate strip portion, opposing strip edge guide flanges respectively axially fixed with said roller and sprocket for edgewise confining said arcuate strip portion therebetween, yieldable means urging said bearing in the direction toothedly engaging said sprocket with said arcuate strip portion, and a second yieldable means urging said shaft axially in the direction to move the edge guide flange fixed with said sprocket toward the edge guide flange fixed with said roller.

9. In a strip feed sprocket device, the combination of a convex member, a cooperating guide member forming with said convex member an arcuate portion of a feed perforated strip on said convex member and mounted for movement to and from adjacent guiding relation therewith, a rotatable sprocket disposed in approximately coaxial relation with said convex member and having multi-toothed engagement with said arcuate strip portion and mounted for movement relative to said convex member radially of the intermediate of said arcuate strip portion, yieldable means urging said sprocket radially into toothed engagement with said arcuate strip portion, and positioning means operatively connected with said cooperating guide member for positioning said sprocket in strip perforation engaging position when said cooperating guide member is out of said guiding relation.

10. In a strip feed sprocket device, the combination of a rotatable roller, a cooperating guide member provided with a concave guide portion forming with said roller an arcuate portion of a feed perforated strip on said roller and mounted for movement to and from adjacent guiding relation therewith, a rotatable sprocket disposed in approximately coaxial relation with said roller and having multi-toothed engagement with said arcuate strip portion and mounted for movement relative to said roller axially thereof and radially of the intermediate of said arcuate strip portion, opposing strip edge guide elements for edgewise confining said arcuate strip portion therebetween a first of which comprises a flange fixed with said sprocket and a second of which is mounted independently of said sprocket, yieldable means operative on said sprocket and urging said sprocket radially into toothed engagement with said arcuate strip portion and said sprocket and flange axially of the sprocket toward said second edge guide element, and positioning means operatively connected with said cooperating guide member for positioning said sprocket and flange axially at a distance from said second guide element greater than normal when said cooperating guide member is out of said guiding relation.

11. In a strip feed sprocket device, the combination of a convex member having one portion of lesser radius than another portion thereof, a cooperating guide member having non-guiding relation with the greater radius portion of said convex member and provided with a concave guide portion disposed opposite the lesser radius portion of said convex member and forming therewith an arcuate portion of a feed perforated strip on said convex member, said guide portion of said cooperating guide member being spaced radially of said convex member approximately at the radius of the convex surface of said arcuate strip portion as established by the greater radius portion of said convex member, a rotatable sprocket disposed in approximately coaxial relation with said convex member and having multi-toothed engagement with said arcuate strip portion and mounted for movment relative to said convex member radially of the intermediate of said arcuate strip portion, and yieldable means urging said sprocket radially into toothed engagement with said arcuate strip portion.

12. In a strip feed sprocket device, the combination of a rotatable roller having its end portions of lesser radius than the intermediate portion thereof, a cooperating guide member having non-guiding relation with the intermediate portion of said roller and provided with concave guide portions spaced axially of said roller and disposed respectively opposite the end portions of said roller and forming therewith an arcuate portion of a feed perforated strip on said roller, said guide portions of said cooperating guide member being spaced radially of said roller approximately at the radius of the convex surface of said arcuate strip portion as established by the intermediate portion of said roller, a rotatable sprocket beyond one end of said roller and disposed in approximately coaxial relation therewith and having multi-toothed engagement with said arcuate strip portion and mounted for movement relative to said convex member radially of the intermediate of said arcuate strip portion, and yieldable means urging said sprocket radially into toothed engagement with said arcuate strip portion.

13. In a strip feed sprocket device, the combination of a rotatable roller having its end portions of lesser radius than the intermediate portion thereof, a cooperating guide member having non-guiding relation with the intermediate portion of said roller and provided with three concave guide portions spaced axially of said roller and two of which are disposed respectively opposite the end portions of said roller and the third of which is disposed beyond one end of said roller and forming therewith an arcuate portion of a feed perforated strip on said roller, said guide portions of said cooperating guide member being spaced radially of said roller approximately at the radius of the convex surface of said arcuate strip portion as established by the intermediate portion of said roller, a rotatable sprocket beyond said end of said roller and between said third guide portion and the guide portion adjacent thereto of said cooperating guide member and disposed in approximately coaxial relation with said roller and having multi-toothed engagement with said arcuate strip portion and mounted for movement relative to said roller radially of the intermediate of said arcuate strip portion, and yieldable means urging said sprocket radially into toothed engagement with said arcuate strip portion.

14. In a strip feed sprocket device, the combination of a rotatable roller having its end portions of lesser radius than the intermediate portion thereof, a cooperating guide member having non-guiding relation with the intermediate portion of said roller and provided with three concave guide portion spaced axially of said roller and two of which are disposed respectively opposite the end portions of said roller and the third of which is disposed beyond one end of said roller and forming therewith an arcuate portion of a feed perforated strip on said roller, said guide portions of said cooperating guide member being spaced radially of said roller approximately at the radius of the convex surface of said arcuate strip portion as established by the intermediate portion of said roller, a rotatable sprocket beyond said end of said roller and between said third guide portion and the guide portion adjacent thereto of said cooperating guide member and disposed in approximately coaxial relation with said roller and having multi-toothed engagement with said arcuate strip portion and mounted for movement relative to said roller axially thereof and radially of the intermediate of said arcuate strip portion, opposing strip edge guide elements for edgewise confining said arcuate strip portion therebetween a first of which comprises a flange fixed with said sprocket and a second of which is mounted independently of said sprocket, and yieldable means urging said sprocket radially into toothed engagement with said arcuate strip portion and said sprocket and said edge guide flange axially of the sprocket toward said second edge guide element.

ALBERT S. HOWELL.